United States Patent
Peng et al.

(10) Patent No.: US 8,204,794 B1
(45) Date of Patent: Jun. 19, 2012

(54) PROCESSING ORDERS FOR WIRELESS SERVICE

(75) Inventors: Shih-Ta Peng, Bellevue, WA (US); Andrei V. Vilkotski, Sammamish, WA (US); Siddhartha Karan Singh, Issaquah, WA (US); Yan Zhang, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 38 days.

(21) Appl. No.: 12/787,053

(22) Filed: May 25, 2010

(51) Int. Cl.
*G06Q 30/00* (2006.01)
(52) U.S. Cl. .................................. 705/26.1
(58) Field of Classification Search .................. 705/26.1
See application file for complete search history.

(56) References Cited

U.S. PATENT DOCUMENTS

2010/0042510 A1* 2/2010 Zeinfeld et al. ................. 705/26

OTHER PUBLICATIONS

Headline Maker: Apple and AT&T Introduce iTunes Activation and Sync for iPhone; M2 Presswire. Coventry: Jun. 26, 2007. p. 1; http://proquest.umi.com/pqdweb?did=1294794571&sid=4&Fmt=3&clientId=19649&RQT=309&VName=PQD.*

* cited by examiner

*Primary Examiner* — Mila Airapetian
(74) *Attorney, Agent, or Firm* — Thomas, Kayden, Horstemeyer & Risley, LLP (57) ABSTRACT

Disclosed are various embodiments for processing orders for wireless service. An order for a wireless device and a wireless service plan is obtained in at least one computing device from a client. The wireless service plan is provided by one of a plurality of wireless carriers. A unique identifier of the wireless device is obtained from a fulfillment system after the wireless device has been pulled from an inventory for fulfillment. A request for activation of the wireless device and the wireless service plan is sent to a system of the one of the wireless carriers. The unique identifier is provided in the request to the system of the one of the wireless carriers.

20 Claims, 3 Drawing Sheets

PROCESSING ORDERS FOR WIRELESS SERVICE

BACKGROUND

With numerous wireless carriers offering service, customers are often shopping around for a wireless plan having, for example, a lower price, more features, or improved coverage. For instance, a customer of one wireless carrier may choose to switch to another wireless carrier or to upgrade to a different service plan from the same wireless carrier. Other customers may be seeking to establish wireless service for the first time or to switch to a wireless carrier from a landline carrier.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to processing orders for wireless service. In various embodiments, a wireless reseller, for example, may have a network site that enables customers to order wireless service from any of several different wireless carriers. Such wireless carriers may offer different wireless service plans with different feature sets and pricing. Wireless devices may be sold in conjunction with wireless service plans. The network site may enable new customers to establish service and/or current customers to upgrade or modify existing service plans. In the following discussion, a general description of the system and its components is provided, followed by a discussion of the operation of the same.

Figure 1:
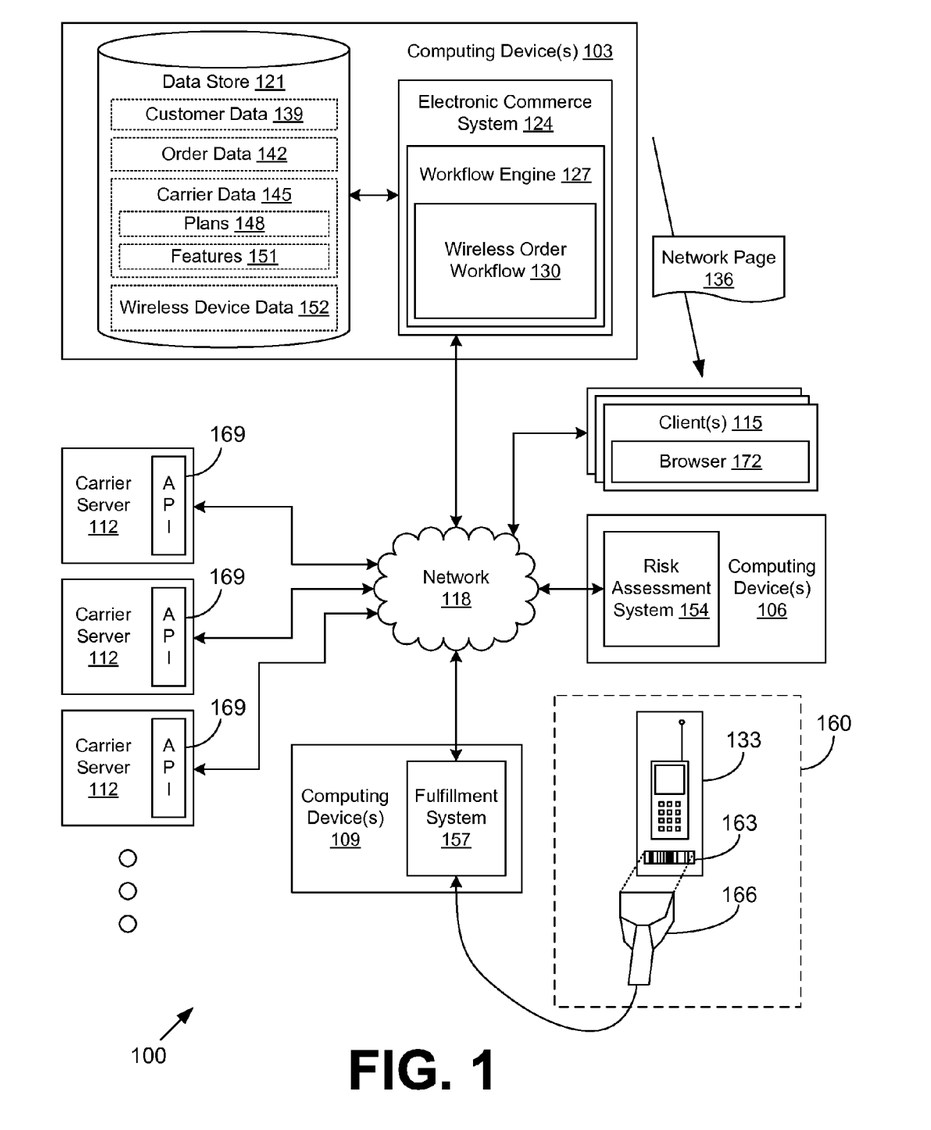
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, one or more computing devices 109, one or more carrier servers 112, and one or more clients 115 in data communication by way of a network 118. The network 118 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 121 that is accessible to the computing device 103. The data store 121 may be representative of a plurality of data stores 121 as can be appreciated. The data stored in the data store 121, for example, is associated with the operation of the various applications and/or functional entities described below.

The components executed on the computing device 103, for example, include an electronic commerce system 124, a workflow engine 127, a wireless order workflow 130, and other applications, services, processes, systems, engines, or functionality not discussed in detail herein. The electronic commerce system 124 is executed in order to facilitate the online purchase of items such as, for example, wireless devices 133 and wireless service plans over the network 118. Such wireless devices 133 may comprise, for example, personal digital assistants, cellular telephones, computers, and other devices. However, it is understood that the electronic commerce system 124 may ultimately facilitate the purchase of any type of item. The electronic commerce system 124 also performs various backend functions associated with the online presence of a merchant in order to facilitate the online purchase of items as will be described. For example, the electronic commerce system 124 generates network pages 136, such as web pages or other types of network content, that are provided to client devices 115 in response to requests for the purposes of selecting items for purchase, rental, download, lease, or other form of consumption and to perform other tasks as will be described.

Among other applications, the electronic commerce system 124 includes a workflow engine 127 that is configured to execute one or more wireless order workflows 130 to perform various backend processing of an order for a wireless device 133 and/or a wireless service plan. The workflow engine 127 may comprise, for example, any commercially available workflow execution engine. The wireless order workflows 130 may be defined, for example, in extensible markup language (XML), business process execution language (BPEL), XML process definition language (XPDL), and/or any other language suitably adapted for defining workflows.

The data stored in the data store 121 includes, for example, customer data 139, order data 142, carrier data 145, wireless service plans 148, features 151, wireless device data 152 and potentially other data. The customer data 139 may include any data relating to wireless customers, including account information such as username, password, personal identification number (PIN), or other security credentials, current wireless carrier information, current wireless service plan information, contractual status of the customer with one or more wireless carriers, customer name, shipping addresses, billing addresses, payment instruments, shopping carts, wish lists, and other information associated with customers as can be appreciated.

The order data 142 may include any data relating to orders, for example, orders for wireless devices 133 and/or wireless service plans 148. Such order data 142 may encompass orders for new wireless service, orders for modifications or upgrades to existing wireless service, and other orders. The carrier data 145 may include data relating to wireless carriers for which the electronic commerce system 124 is configured to offer service and/or compatible wireless devices 133. Such data may describe parameters used to govern whether a customer is eligible for service from the wireless carrier, parameters used to enter the order and/or activate the service with a carrier server 112, parameters used to obtain a commission for a sale, and other data.

In particular, carrier data 145 may include wireless service plans 148 and features 151 offered by each wireless carrier. The plans 148 may describe features 151 associated with wireless service plans including, but not limited to, a number of weekday voice minutes per billing period, a number of night and weekend minutes per billing period, text messaging capabilities included, overage charges, whether unused minutes rollover to the next billing period, whether calls to designated numbers avoid airtime charges, whether calls to other users of the wireless carrier avoid airtime charges, starting and ending times for nights and weekends, data plan charges, additional line charges, and/or other features. The plans 148 may also specify geographic areas in which the wireless service plan is available. Features 151 may also describe optional features 151 outside of a plan 148 that may be added to a plan 148.

The wireless device data 152 describes a plurality of wireless devices 133, including their respective feature sets and with which types of wireless networks they are compatible. As a non-limiting example of feature sets, some wireless devices 133 may have digital cameras and/or music players, whereas others may not. As another non-limiting example, some wireless devices 133 may have keyboards, whereas others may have touch screens. Regarding wireless network compatibility, as non-limiting examples, one wireless device 133 may be compatible with Global System for Mobile Communications (GSM) wireless networks, whereas another wireless device 133 may be compatible with Code Division Multiple Access (CDMA) wireless networks, while still another wireless device 133 may compatible with both GSM and CDMA networks.

The computing devices 106, 109 and carrier servers 112 may comprise, for example, server computers or any other systems providing computing capability. Alternatively, respective pluralities of computing devices 106, 109 and carrier servers 112 may be employed that are arranged, for example, in one or more server banks or computer banks or other arrangements. For example, a respective plurality of computing devices 106, 109 and carrier servers 112 together may comprise, for example, a cloud computing resource, a grid computing resource, and/or any other distributed computing arrangement. Such computing devices 106, 109 and carrier servers 112 may be located in a single installation or may be dispersed among many different geographical locations. In one embodiment, the computing device 106, 109 and carrier servers 112 each represent a virtualized computer system executing on one or more physical computing systems. For purposes of convenience, the computing device 106, 109 is referred to herein in the singular. Even though the computing device 106, 109 is referred to in the singular, it is understood that a plurality of computing devices 106, 109 may be employed in the various arrangements as described above.

Various applications and/or other functionality may be executed in the computing device 106 according to various embodiments. The components executed on the computing device 106, for example, include a risk assessment system 154 and other applications, services, processes, systems, engines, or functionality not discussed in detail herein. The risk assessment system 154 is executed to perform a risk assessment on a prospective customer. Such a risk assessment may comprise, for example, a credit check, identity verification, reference check, or other form of risk assessment. In some embodiments, the risk assessment system 154 may be operated by the same entity as the computing device 103. In other embodiments, the risk assessment system 154 may be operated by one or more third-party providers of risk assessment information.

Various applications and/or other functionality may be executed in the computing device 109 according to various embodiments. The components executed on the computing device 109, for example, include a fulfillment system 157 and other applications, services, processes, systems, engines, or functionality not discussed in detail herein. The fulfillment system 157 is executed to direct the operations of one or more fulfillment centers 160 so that orders placed through the electronic commerce system 124 are fulfilled. To this end, the fulfillment system 157 may be configured to generate one or more shipping manifests for each order to direct the picking of items from inventory, the packing of the items, and/or other tasks relating to item shipment.

Specifically, the fulfillment system 157 may direct the picking of wireless devices 133 from bins or other inventory locations in the fulfillment center 160 in fulfillment of orders. When agents of the fulfillment center 160 pull a wireless device 133 from the inventory, the agents may be directed to scan or otherwise input an identifier 163 into the fulfillment system 157 using a scanner 166, keyboard, touch screen, or other input device. The identifier 163 may comprise a unique identifier such as an international mobile equipment identity (IMEI), a mobile equipment identifier (MEID), and/or other unique identifiers for wireless devices 133. The identifier 163 may comprise a number, hexadecimal string, bar code, radiofrequency identifier (RFID), and/or any other type of identifier 163.

Each of the carrier servers 112 is operated by a wireless carrier so as to provide service, for example, to a wireless device 133 in accordance with a service plan 148 purchased by the customer. Each carrier operates, for example, a wireless network to provide wireless service to the wireless device 133. Each carrier maintains an application programming interface (API) 169 to facilitate communication with outside entities who sell service plans 148 of the respective carrier. In one embodiment, each of the wireless carriers is associated with a distinct API. Once a service plan 148 associated with a given carrier is ordered, then the wireless order workflow 130 communicates with the corresponding carrier server 112 through the respective API 169 to request activation of the service for the wireless device 133. The wireless order workflow 130 may also request porting of a contact designation such as a telephone number from a previous wireless device 133 to the recently purchased wireless device 133.

The client 115 is representative of a plurality of client devices that may be coupled to the network 118. The client 115 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 115 may be configured to execute various applications such as a browser 172 and/or other applications. The browser 172 may be executed in a client 115, for example, to access and render network pages 136, such as web pages, or other network content served up by the computing device 103 and/or other servers. The client 115 may be configured to execute applications beyond browser 172 such as, for example, email applications, instant message applications, and/or other applications.

Next, a general description of the operation of the various components of the networked environment 100 is provided. To begin, a customer obtains one or more network pages 136 from the electronic commerce system 124 over the network 118. The network page(s) 136 may relate to the merchandising of wireless devices 133 and/or wireless service plans 148 from a plurality of wireless carriers. The customer may provide security credentials for authentication or identity verification with the customer data 139. When the customer is an existing customer, the network page(s) 136 may present various options for features 151 to be added or modified in an existing wireless service plan 148. The network page(s) 136 may also present, for example, options for upgrading an existing wireless service plan 148 to another wireless service plan 148, purchasing a new wireless device 133, and other options.

Through the ordering process, the customer may provide shipping addresses, billing addresses, payment instruments, and other information. Ultimately, a confirmation of order receipt is sent to the customer. Subsequently, backend processing of the order by the wireless order workflows 130 may begin.

When the customer is a new customer, wireless carriers may require that the customer pass a risk assessment such as, for example, a credit check, identity verification, etc. The risk assessment may result in a score such as, for example, a credit score. The wireless carriers may require that the customer have a score that meets or exceeds a predetermined threshold, which may be different from carrier to carrier. If the customer cannot pass the risk assessment, the customer may be denied service, may be denied a specific service plan 148 or package, may need to pay a deposit upfront, or may have to take other actions before processing of the order may continue.

The risk assessment of the customer may be performed synchronously or asynchronously by the wireless order workflow 130. The wireless order workflow 130 may generate a request for the risk assessment, which is then sent via the network 118 to the risk assessment system 154 on the computing device 106. The request may embody certain information used to identify the customer that is taken from customer data 139. Such information may include, for example, name, social security number, birth date, place of birth, mother's maiden name, and/or other information to identify the customer. The risk assessment system 154 may be operated, for example, by an external credit scoring entity or some other risk assessing entity.

The order may be placed on hold pending the return of the risk assessment from the risk assessment system 154. If the risk assessment is unsatisfactory for the wireless carrier associated with the order, the wireless order workflow 130 may generate a notification to inform the customer of the problem. Such a notification may be presented, for example, through email, text message, network page 136, etc. In some cases, the customer may be able to provide more information, pay a deposit, switch the order to another wireless carrier or another plan 148, or take some other action to enable continued processing of the order. In other cases, the customer may be unable to remedy the issue, and the order may remain abandoned or canceled.

The wireless order workflow 130 may also determine whether the customer is eligible for the selected wireless service plan 148 and/or wireless device 133 in the order. The offer presented by the electronic commerce system 124 to the customer may have specific conditions that have to be evaluated and met for the customer to obtain or modify service. As a non-limiting example, if the contractual status of a customer indicates that the customer is currently under contract for a first wireless service plan 148 at one price, the customer may not be eligible to move to a second wireless service plan 148 at a lower price. As another non-limiting example, it may be determined that a customer lives in an area where wireless service is not available to be sold by the selected wireless carrier. As yet another non-limiting example, the telephone number or other contact designation of the customer may not be eligible to be ported to the selected wireless carrier. Some of these conditions may apply to existing customers, while others may apply to new customers.

If a customer is determined not to be eligible for the selected wireless service plan 148, processing of the order may be placed on hold. The wireless order workflow 130 may generate a notification to inform the customer of the problem. Such a notification may be presented, for example, through email, text message, network page 136, etc. A customer may then be given an opportunity to make changes to the order, such as, for example, selecting a different wireless carrier, selecting a different wireless service plan 148, selecting a different combination of features 151, and so on, in order for the customer to attempt to resolve the ineligibility. If the customer is unwilling or unable to make such changes, processing of the order may be canceled.

The wireless order workflow 130 may determine whether the features 151 selected in the order are compatible with the selected wireless service plan 148 or existing wireless service plan 148 of the customer. For example, the customer may have selected a feature 151 of text messaging to be added to a family plan 148, which currently has one of two lines activated for text messaging. Because the new feature 151 may be a plan-level feature 151 rather than a line-level feature 151, the new feature 151 may be incompatible with the existing feature 151.

To remedy this issue, the wireless order workflow 130 may be configured to purge one or more of the existing features 151 from the wireless service plan 148 and then replace the existing feature(s) 151 with the new feature(s) 151. Alternatively, the wireless order workflow 130 may be configured to cancel the order or put the order on hold for further intervention by the customer to correct any feature 151 incompatibilities. In another embodiment, the electronic commerce system 124 may be configured to perform a cross matching of features 151 between an existing plan 148 and a new plan 148 and to notify the customer of the incompatibility when the customer is entering the order.

If the customer is qualified and any incompatibilities in the order have been resolved, the wireless order workflow 130 may release the order for fulfillment. In one embodiment, when the order includes one or more wireless devices 133, an instruction may be sent to the fulfillment system 157 to fulfill the order at one or more fulfillment centers 160. For each of the wireless devices 133, an agent at the fulfillment center 160 may be provided with a shipping manifest with instructions to pull one or more wireless devices 133 from inventory for packing and shipment. When the agent has located a wireless device 133 from inventory, the agent may then input one or more identifiers 163, such as, for example, an IMEI or MEID, from the packaging of the wireless device 133 or directly from the wireless device 133. Where the wireless device 133 includes a subscriber identity module (SIM) card, a service-subscriber identifier 163, such as, for example, an international mobile subscriber identity (IMSI), may be scanned.

Such identifiers 163 may uniquely identify the wireless device 133 to the wireless carrier. A scanner 166 or other input device may be used. Data describing the identifier 163 may then be transmitted to the fulfillment system 157 and subsequently obtained over the network 118 by the wireless order workflow 130. Where a customer has an existing wireless device 133, the customer data 139 may include one or more identifiers 163 for the existing wireless devices 133 entered by the customer. When the identifier 163 is obtained by the wireless order workflow 130, a request to activate the wireless device 133 and/or a wireless service plan 148 from the order may be generated and sent to the carrier server 112 of the corresponding wireless carrier. Where the order is merely for a modification of existing features 151 of a current wireless service plan 148, the request may or may not have identifiers 163 corresponding to wireless devices 133.

The request to activate the ordered wireless service may be generated by the wireless order workflow in a format that is specific to the API 169 of the wireless carrier. In one embodiment, each of the wireless carriers may be associated with a distinct API 169 and may have different sets of features 151 and policies. In one embodiment, a wireless carrier may merely be a reseller of services from another wireless carrier. Such a wireless carrier may then use the same API 169 and may use the same carrier server 112 as the other wireless carrier. In some embodiments, the wireless order workflow 130 may communicate with the carrier server 112 to charge a commission for the order on behalf of the wireless reseller that operates the electronic commerce system 124.

Although a request to activate the wireless service may be sent by the wireless order workflow 130 to the carrier server 112, in some embodiments the wireless service will be activated after some manual task is performed by the customer. In one embodiment, the wireless order workflow 130 requests that a contact designation be automatically ported to the new wireless device 133 and wireless service plan 148 after a predetermined period of time, such as fourteen days or some other time period. Automatic porting or activation, if available through the wireless carrier, may reduce the possibility that the customer is unknowingly using a wireless device 133 under an old wireless service plan 148, which, for example, could cause significant charges to be incurred if the customer exceeds the limits of the old wireless service plan 148 while believing that the new wireless service plan 148 has been completely activated.

Although automatic porting may be requested, the customer may be able to port the number manually earlier. In some embodiments, such manual porting or activation may be necessary. To this end, the wireless order workflow 130 may send a notification to the customer describing one or more tasks for the customer to perform to complete the activation of the wireless service plan 148 and/or the wireless device 133. Such a notification may be sent, for example, after the request for activation is sent to the carrier server 112.

In addition, one or more other notifications may be sent to the customer regarding the status of the wireless service activation. These notifications may comprise, for example, text messages, emails, network pages 136, etc. The notifications may indicate, for example, successful completion of the activation or errors that may necessitate further configuration or input from the customer.

Figure 2:
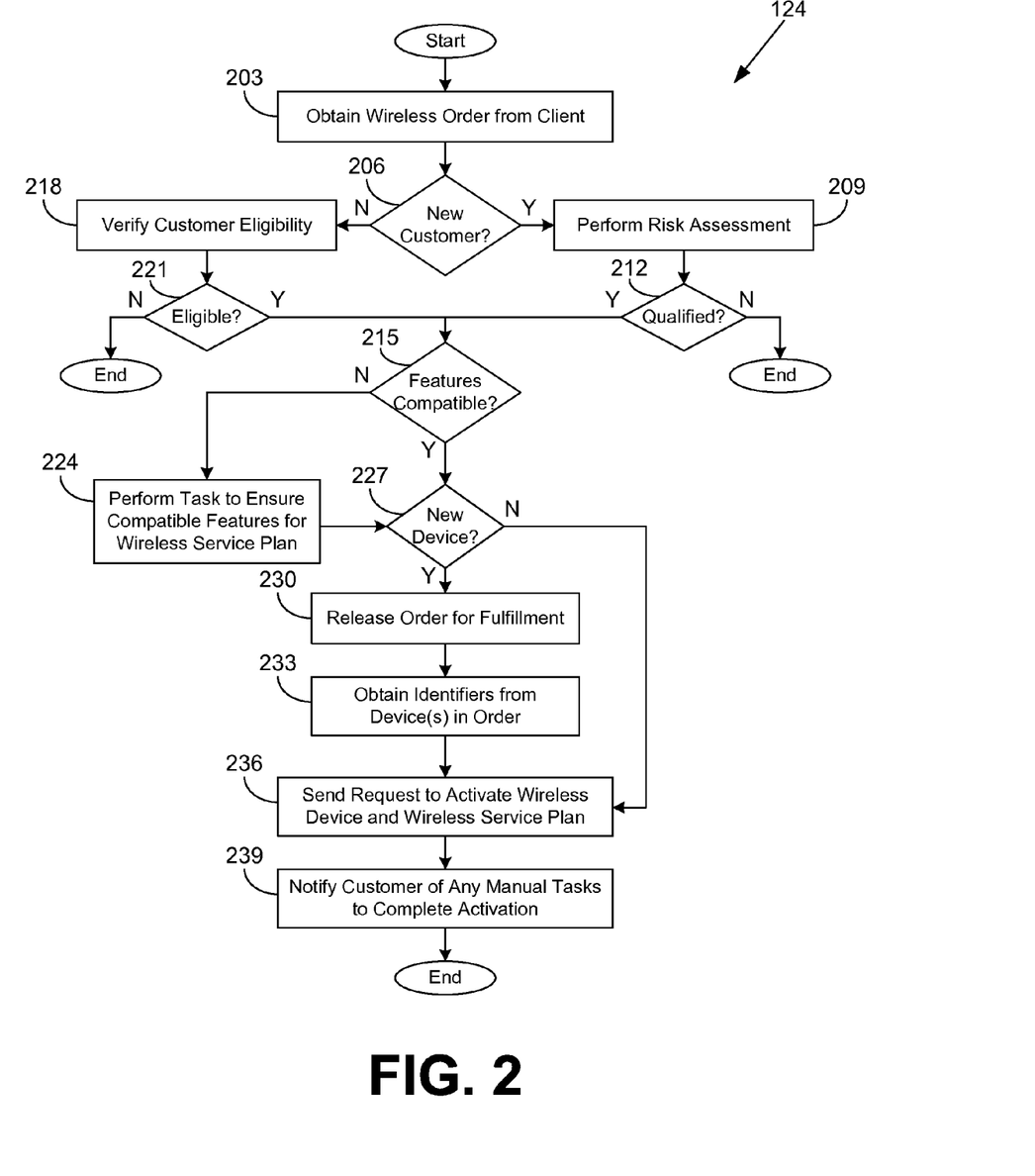
FIG. 2 is a flowchart illustrating one example of functionality implemented as portions of an electronic commerce system executed in a computing device in the networked environment of FIG. 1 according to various embodiments of the present disclosure.

Referring next to FIG. 2, shown is a flowchart that provides one example of the operation of a portion of the electronic commerce system 124 according to various embodiments. It is understood that the flowchart of FIG. 2 provides merely an example of the many different types of functional arrangements that may be employed to implement the operation of the portion of the electronic commerce system 124 as described herein. As an alternative, the flowchart of FIG. 2 may be viewed as depicting an example of steps of a method implemented in the computing device 103 (FIG. 1) according to one or more embodiments.

Beginning with box 203, the electronic commerce system 124 obtains a wireless order from a client 115 (FIG. 1) associated with a customer. The wireless order may be for one or more wireless devices 133 (FIG. 1) and/or one or more wireless service plans 148 (FIG. 1). The order may also specify a combination of additional features 151 (FIG. 1) to be included with a selected wireless service plan 148. In box 206, the electronic commerce system 124 determines whether the customer is a new customer.

If the customer is a new customer of the wireless carrier, the electronic commerce system 124 moves to box 209 and performs a risk assessment on the customer, such as a credit check or other risk assessment. In box 212, the electronic commerce system 124 determines whether the customer is qualified for the order according to the results of the risk assessment. In one embodiment, the risk assessment may result in a score, which is then compared to a threshold for obtaining service. The threshold may depend on the wireless carrier associated with the selected wireless service plan 148. If the customer is not qualified, the order may be placed on hold or canceled, and the customer may be notified. Thereafter, the portion of the electronic commerce system 124 ends. If the customer is qualified, the electronic commerce system 124 proceeds to box 215.

If the customer is determined not to be a new customer in box 206, the electronic commerce system 124 proceeds to box 218 and verifies the eligibility of the customer to proceed with the order. As non-limiting examples, the customer may need to be resident in a certain service area, have an acceptable payment history, not be contractually limited from switching to the selected wireless service plan 148 of the order, and so on. If the customer is determined to be not eligible to proceed with the order in box 221, the order may be placed on hold or canceled, and the customer may be notified. In various embodiments, the customer may be given an opportunity to modify the order to meet eligibility requirements. For example, eligibility may pertain to the eligibility of the customer to order a wireless device 133 at a discounted price in connection with a service contract associated with the wireless service plan 148. The customer may be eligible to proceed with the order, for example, by selecting a different wireless device 133, paying an increased price, or taking some other action. Thereafter, the portion of the electronic commerce system 124 ends. Otherwise, if the customer is determined to be eligible for the order in box 221, the electronic commerce system 124 moves to box 215.

In box 215, the electronic commerce system 124 determines whether the features 151 indicated by the order are compatible with one another and the selected wireless service plan(s) 148 and/or wireless device(s) 133. If the features 151 are not compatible, in box 224, the electronic commerce system 124 performs one or more tasks to ensure that the features 151 are compatible for the wireless service plan 148 and/or the wireless device 133. For example, incompatible features 151 may be purged from the order and replaced with compatible features 151. For example, incompatible features 151 may be removed and the customer notified. The electronic commerce system 124 proceeds to box 227. If the features 151 specified in the order are determined to be compatible, the electronic commerce system 124 also proceeds to box 227.

In box 227, the electronic commerce system 124 determines whether a new wireless device 133 has been ordered. In one embodiment, an order for a wireless service plan 148 is presumed to include an order for a new wireless device 133. If a new wireless device 133 has been ordered, the electronic commerce system 124 transitions to box 230 and releases the order of the wireless device 133 for fulfillment. The wireless device 133 then may be picked from inventory in a fulfillment center 160 (FIG. 1). Next, in box 233, the electronic commerce system 124 obtains one or more identifiers 163 (FIG. 1) of the wireless device(s) 133 in the order from the fulfillment system 157 (FIG. 1). The electronic commerce system 124 proceeds to box 236. If a new wireless device 133 has not been ordered, the electronic commerce system 124 also proceeds to box 236.

In box 236, the electronic commerce system 124 sends a request to activate a wireless device 133, whether new or existing, and a wireless service plan 148 to the carrier server 112 (FIG. 1) corresponding to the wireless carrier of the wireless service plan 148. The request may be directed to a distinct API 169 (FIG. 1) of the wireless carrier. Next, in box 239, the electronic commerce system 124 may notify the customer of any manual tasks to complete the activation. As a non-limiting example, the customer may be requested to call the wireless carrier with the wireless device 133 to finish the activation. Thereafter, the portion of the electronic commerce system 124 ends.

Figure 3:
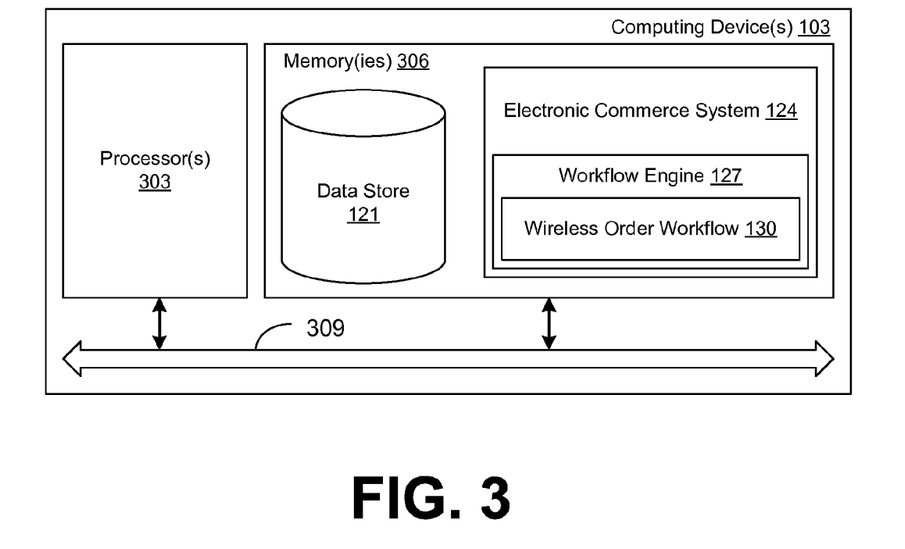
FIG. 3 is a schematic block diagram that provides one example illustration of a computing device employed in the networked environment of FIG. 1 according to various embodiments of the present disclosure.

With reference to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 is an electronic commerce system 124 encompassing a workflow engine 127 and at least one wireless order workflow 130, along with potentially other applications. Also stored in the memory 306 may be a data store 121 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 118 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the electronic commerce system 124, the workflow engine 127, the wireless order workflow 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the electronic commerce system 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 124, the workflow engine 127, and the wireless order workflow 130, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains an order for a wireless device and a wireless service plan from a customer at a client, the wireless service plan being provided by one of a plurality of wireless carriers supported by the electronic commerce system;

code that determines whether a conflict exists between a first feature set of the wireless service plan and a second feature set of an existing wireless service plan of the customer;

code that upgrades the existing wireless service plan to the wireless service plan by:
removing at least one feature associated with the second feature set from the existing wireless service plan when the conflict exists, and
adding at least one feature associated with the first feature set to the existing wireless service plan;

code that determines eligibility of the customer for the wireless service plan;

code that obtains a unique identifier of the wireless device from a fulfillment system after the wireless device has been pulled from an inventory for fulfillment; and code that sends a request for activation of the wireless device and the wireless service plan to a system of the one of the wireless carriers when the customer is determined to be eligible for the wireless service plan, the request for activation being sent using an application programming interface specific to the one of the wireless carriers, the unique identifier being provided in the request for activation.

2. The computer-readable medium of claim 1, wherein eligibility of the customer further pertains to eligibility of the customer to order the wireless device at a discounted price in conjunction with a service contract associated with the wireless service plan.

3. A system, comprising:

at least one computing device; and an electronic commerce system executable in the at least one computing device, the electronic commerce system comprising:

logic that obtains an order for a wireless service plan from a customer at a client, the wireless service plan being provided by one of a plurality of wireless carriers supported by the electronic commerce system;

logic that determines whether a conflict exists between a first feature set of the wireless service plan and a second feature set of an existing wireless service plan of the customer;

logic that upgrades the existing wireless service plan to the wireless service plan by:
removing at least one feature associated with the second feature set from the existing wireless service plan when the conflict exists, and
adding at least one feature associated with the first feature set to the existing wireless service plan; and logic that sends a request for activation of the wireless service plan to a system of the one of the wireless carriers.

4. The system of claim 3, wherein the request for activation is sent using an interface that is specific to the one of the wireless carriers.

5. The system of claim 3, wherein the electronic commerce system further comprises:

logic that determines eligibility of the customer for the wireless service plan;

logic that obtains a unique identifier of a wireless device associated with the order from a fulfillment system after the customer has been determined to be eligible for the wireless service plan and the wireless device has been pulled from an inventory for fulfillment of the order; and wherein the request for activation includes the unique identifier.

6. The system of claim 5, wherein the electronic commerce system employs a workflow engine to execute at least the logic that determines and the logic that sends as at least one wireless order workflow.

7. The system of claim 3, wherein the request for activation specifies that at least one telephone number associated with the order be automatically ported to the one of the wireless carriers after a predetermined time period.

8. The system of claim 3, wherein the electronic commerce system further comprises logic that sends a notification to the customer after the request for activation is sent.

9. The system of claim 8, wherein the notification describes at least one task for the customer to perform in order to complete the activation of the wireless service plan.

10. The system of claim 3, wherein the electronic commerce system further comprises logic that sends a notification that the order is canceled to the customer when the customer is determined to be not eligible for the wireless service plan.

11. The system of claim 3, wherein the logic that determines eligibility of the customer for the wireless service plan further comprises logic that determines a risk assessment score associated with the customer when the customer is a new customer of the one of the wireless carriers, and the customer is eligible for the wireless service plan when the risk assessment score meets a threshold.

12. The system of claim 3, wherein the logic that determines eligibility of the customer for the wireless service plan is configured to determine eligibility of the customer based at least in part on a contractual status of the customer with the one of the wireless carriers when the customer is an existing customer of the one of the wireless carriers.

13. A method, comprising the steps of:
obtaining, in at least one computing device, an order for a wireless service plan from a client, the wireless service plan being provided by one of a plurality of wireless carriers;
determining, in the at least one computing device, whether a conflict exists between a first feature set of the wireless service plan and a second feature set of an existing wireless service plan associated with the order;
removing, in the at least one computing device, at least one feature associated with the second feature set from the existing wireless service plan when the conflict exists;
adding, in the at least one computing device, at least one feature associated with the first feature set to the existing wireless service plan to upgrade the existing wireless service plan to the wireless service plan; and
sending, in the at least one computing device, a request for activation of the wireless service plan to a system of the one of the wireless carriers.

14. The method of claim 13, wherein the request for activation is sent to the system of the one of the wireless carriers through an application programming interface associated with the one of the wireless carriers, and each of at least two of the wireless carriers is associated with a distinct application programming interface.

15. The method of claim 13, further comprising the step of performing, in the at least one computing device, a credit check on at least one customer associated with the order.

16. The method of claim 13, further comprising the step of verifying, in the at least one computing device, whether a customer associated with the order is eligible to upgrade from the existing wireless service plan to the wireless service plan.

17. The method of claim 13, further comprising the step of sending, in the at least one computing device, a notification to the client after the request for activation is sent, the notification describing at least one manual task to be performed in order to complete the activation of the wireless service plan.

18. The method of claim 13, further comprising the steps of:
obtaining, in the at least one computing device, a unique identifier of a wireless device associated with the order from a fulfillment system after the wireless device has been pulled from an inventory for fulfillment; and
providing, in the at least one computing device, the unique identifier in the request for activation to the system of the one of the wireless carriers.

19. The system of claim 5, wherein the unique identifier is of an identifier type that is selected from the group consisting of: an international mobile equipment identity (IMEI) and a mobile equipment identifier (MEID).

20. The system of claim 5, wherein eligibility of the customer further pertains to eligibility of the customer to order the wireless device at a discounted price in conjunction with a service contract associated with the wireless service plan.

* * * * *